United States Patent [19]

Durkin

[11] 4,055,762

[45] Oct. 25, 1977

[54] RADON DAUGHTER DOSIMETER

[75] Inventor: John Durkin, Bethel Park, Pa.

[73] Assignee: The United States of America as represented by the Secretary of the Interior, Washington, D.C.

[21] Appl. No.: 670,213

[22] Filed: Mar. 25, 1976

[51] Int. Cl.$^2$ .............................................. G01V 5/00
[52] U.S. Cl. .................................. 250/253; 250/255; 250/364; 250/370
[58] Field of Search ............... 250/253, 255, 380, 364, 250/370, 386

[56] References Cited

U.S. PATENT DOCUMENTS

| | | | |
|---|---|---|---|
| 2,878,391 | 3/1959 | Campbell | 250/253 |
| 2,892,091 | 6/1959 | Sawle | 250/364 |
| 3,056,886 | 10/1962 | Glaude et al. | 250/364 |
| 3,665,194 | 5/1972 | Alter | 250/253 |
| 3,914,602 | 10/1975 | Goldstein | 250/364 |
| 3,968,371 | 7/1976 | Greendale | 250/380 |

Primary Examiner—Harold A. Dixon
Attorney, Agent, or Firm—Thomas Zack; Donald A. Gardiner

[57] ABSTRACT

A portable radon daughter dosimeter unit used to measure Radon gas alpha daughters in ambient air. These measurements can then be related to preselected preestablished standards contained in a remote central readout unit. The dosimeter unit is adapted to be worn by an operator in areas having alpha particle radiation such as in uranium mines. Within the dosimeter is a detector head housing having a filter head and a solid state surface barrier radiation detector; an air pump to get air to the detector head; a self contained portable power supply for the unit; and electronic circuitry to process detected charged electrons from the detector head to convert and count their pulses representatives of two alpha radon emitter daughters. These counted pulses are in binary form and are sent to a readout unit where a numerical readout displays the result in terms of working level-hours.

8 Claims, 6 Drawing Figures

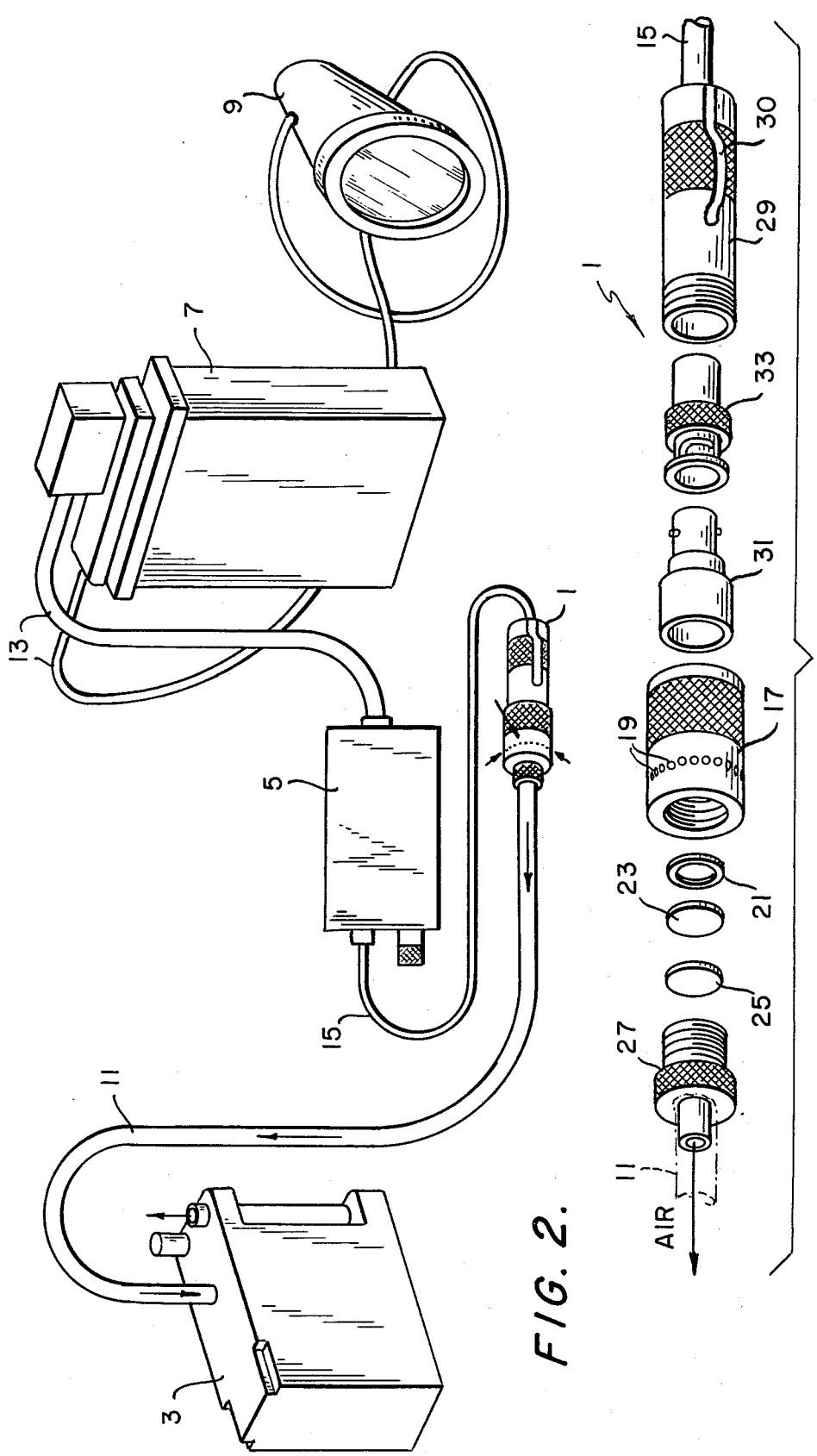

RADON DAUGHTER DOSIMETER

BACKGROUND OF THE INVENTION

Field of the Invention

This invention is a radon daughter dosimeter unit used to measure the user's overall exposure in terms of working level hours units.

SUMMARY OF THE INVENTION

The invention described herein is a portable radon daughter dosimeter unit used to continuously measure alpha daughters and then relate these measurements to preselected preestablished standards by connecting the unit to a readout unit. The dosimeter unit has a detector head with a filter head and a solid state surface barrier radiation detector. In addition, it also has a air pump to force air to the detector head, a self contained power supply, and appropriate circuitry to process the electrons received from the radiation detector by first converting them to distinct representative pulses and then counting these pulses signals.

The primary object of this invention is an improved radon daughter dosimeter.

BRIEF DESCRIPTION OF THE DRAWINGS

FIG. 2 illustrates the preferred embodiment of the basic dosimeter unit combined with a conventional miner's cap lamp and battery.

FIG. 3 is an exploded view of the detector head.

Figure 1:
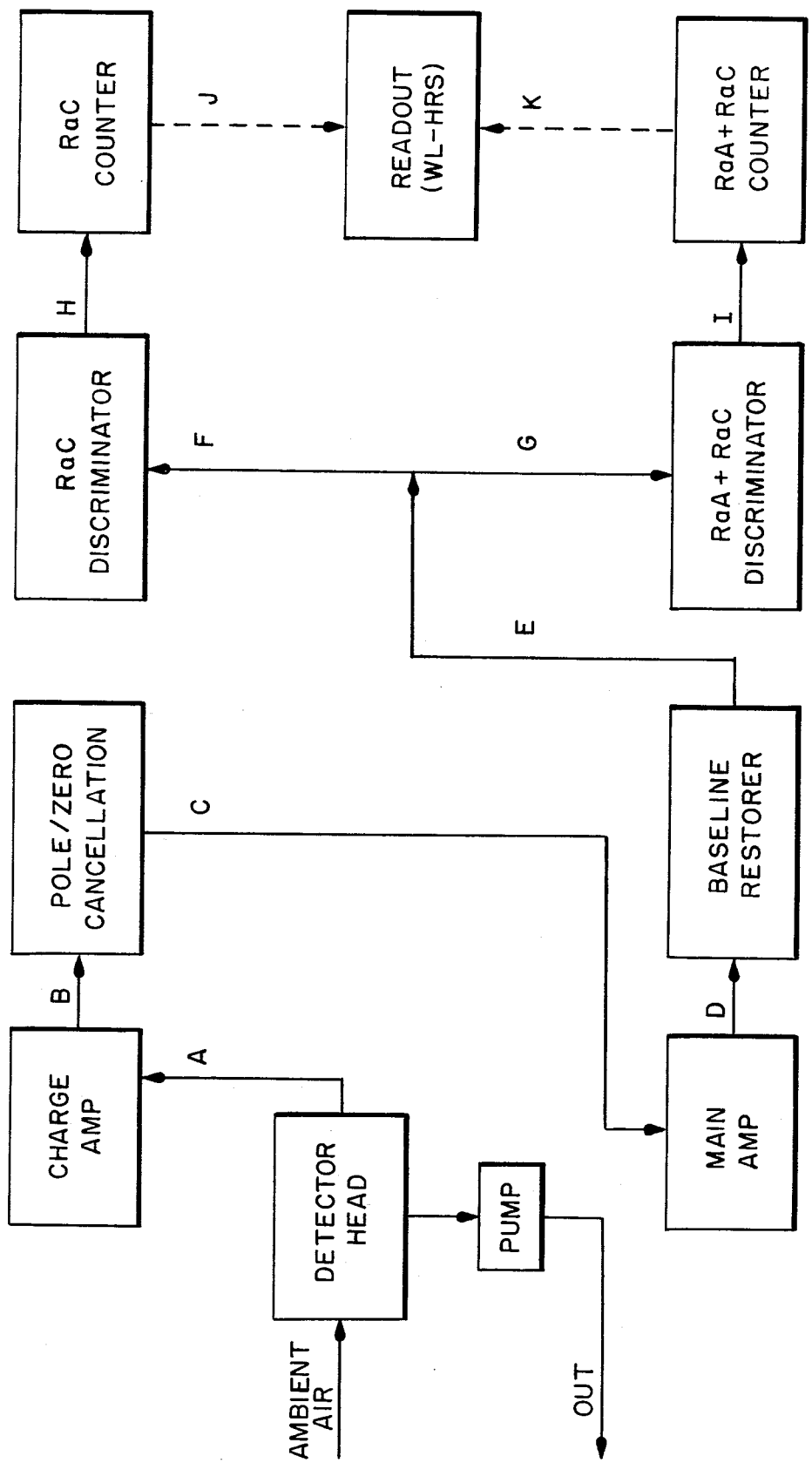
FIG. 1 is a block diagram of the combined dosimeter unit and readout unit.

Beginning with the entry of ambient air into the detector head in FIG. 1, the basic functions of the system will be outlined. A portable pump forces the air containing the radon daughters by suction into the head wherein it first encounters a filter head that filters it with a micron sized membrane filter paper. This filter traps dust particles and other undesired particulate matter to which the alpha particles have adhered as well as unattached daughters of radon. Normally this head is worn by a user on his clothing. After filtering the particles which have impinged and become deposited on the filter paper have their decay products detected by the radiation detector. In the preferred embodiment these products are two of Radon's 222 alpha emitter daughters RaA and RaC. To detect these daughters a surface barrier radiation detector is used to convert the radioactive decay event to a charged pulse A.

Pulse A is amplified and integrated by the charged amplifier circuitry of FIG. 1 and converted to a voltage pulse signal B whose amplitude or height is directly proportional to the energy levels of the two radon daughters. The actual energy levels of these two alpha particle daughters is 6 million electron volts (MeV) for RaA and 7.68 MeV for the RaC daughter. The pole/zero cancellation network receives signal B and reduces its pulse duration to avoid overlapping of consecutive pulses. Output signal C is thus a sped up version of signal B with the same pulse height. The main amplifier circuit again amplifies the signal and outputs signal D to the baseline restorer circuit. Here the signal is returned to zero baseline by getting rid of any initial bias voltage. Signal E is then subjected to pulse height analysis so that the two different height pulses representative of the two daughters can be differentiated. This is accomplished by discriminating between their pulse heights with the aid of two threshold detectors. Signals F, representative of daughter RaC, are discriminated by setting one of the threshold detectors high and counting any pulses which exceed this threshold level. Signal G is representative of the discrimination associated with the two signal of RaA + RaC. It accomplishes this purpose by setting the second threshold detector low, above the normal noise level, and counting all pulses E above that level. Since this count of signals G represents the total count of pulses associated with daughters RaA and RaC the actual count for RaA can be obtained by subtracting the RaC pulse count. This subtraction is accomplished in the readout unit when connected to the dosimeter unit. Signals J and K represent these two accumulated count signals as they are being transmitted to the readout unit.

In FIG. 2 the dosimeter unit is depicted connected to the portable pump 3, battery 7, and miner's cap light 9. The dosimeter unit is made up of the detector head 1 and the necessary electronics contained in the housing 5. A 0.25 inch diameter tygon air conduit tube 11 runs from the pump to the head and acts to force ambient air containing the radon gas from the head to the pump. This air follows the flow path as indicated by the arrows. An eighteen inch long coaxial cable 15 connects the head's detector to the electronics and two other cables 13 connect the power supply to the electronics and the miner's lamp. A Model G portable pump manufactured by Mine Safety Appliances Company of Pittsburgh, Pa. can be used to move the air. This off the shelf unit is the same one currently being extensively used to sample coal mine air to determine the concentrations of dust particles. The power supply is an external Caplamp battery rated at 4 volts. As will be described with respect to the FIG. 5 circuitry, there is a power supply circuit that converts this 4 volt external battery voltage to ± 6 volt potential within the electronics housing 5.

The detector head is illustrated in an exploded view in FIG. 3. Air is forced into the eighteen peripheral holes 19 of the head cylinder 17. Within the cylinder a Teflon gasket 21, a stainless steel screen 23, and a membrane filter paper 25 are held tightly by the holder 27 when it threadedly engages internal threads of the holder 27. The screen is a 120 mesh .510 inch type and the complementary holder and cylinder head are made of aluminum material and sized to receive the three inserts stated. An aluminum cylinder cap 29 has lower external threads which engage the internal threads of the cylinder head. Partially encircling this cap is a flexible metal clip 30, such as those used with pens, to allow the head to be clipped to the pocket of a user and held in an upright position. The surface barrier detector 31 and the connector terminal 33 from cable 15 are both enclosed by the cap.

The detector is of the solid state type such as the BR series model manufactured by Ortec Incorporated of Oak Ridge, Tenn. In such a detector the usual gas found within an ionization chamber is replaced by a semiconducting solid of high purity silicon or germanium. This allows a more stable, smaller, and effective radiation detector than those with gas. The charged radon isotopes create free electron-hole pairs as they enter the detector by losing energy at a given rate depending on particle and energy type. These free electrons are separated by a maintained reverse bias diode electric field and a current is the end result. By measuring the current it is possible to determine basic information about the incident radiation. Further details on the operation and theory behind their operation may be found in the Ortec Incorporated publication entitled "Instruction Manual Surface Barrier Detectors" pages 3-1 to 3-11, inclusive.

Figure 4:
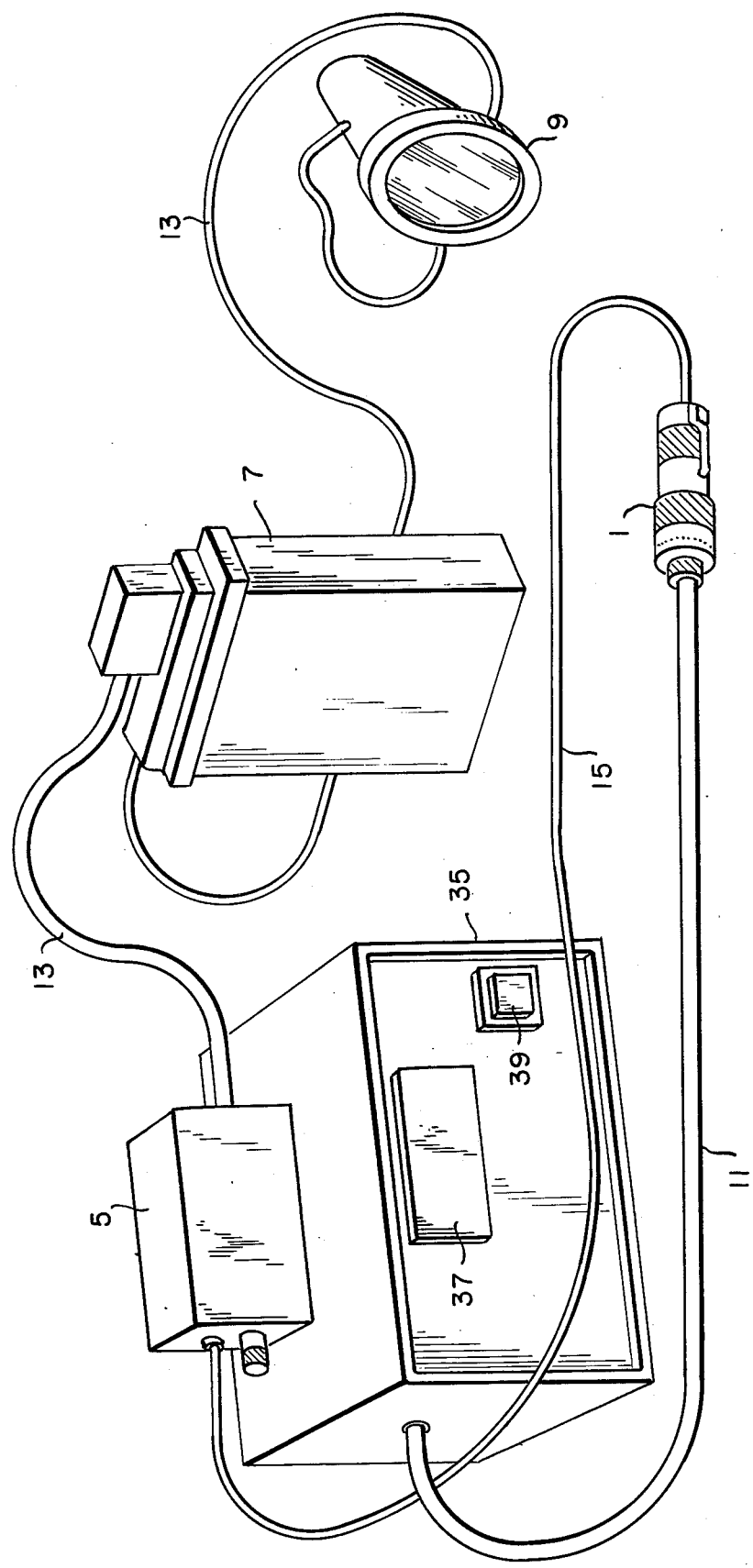
FIG. 4 depicts the dosimeter unit of FIG. 2 connected to the readout unit.

FIG. 4 is similar to FIG. 2 excepting that the radon dosimeter readout is shown connected to the dosimeter unit. When used in an actual mining operation it is contemplated that many separate dosimeters carried by different persons will be connectable to a single central readout unit at the end of a working day. As each dosimeter is serially connected to readout unit 35 by plugging dosimeter 5 into its upper surface, the working level hours (WL-HRS) will be displayed on the digital panel meter 37 after power is turned on by button 39. The data being inputted into the readout is in binary form and is converted to a voltage level within the readout. The voltage level is in turn converted by appropriate circuitry to a numerical readout according to the following equation:

$$WL - HRS = \frac{1.68\ N2 + 6N1}{G \times 1.3 \times 10^5 \times F} \quad (1)$$

where N1 is the number of dosimeter counted RaA + RaC particles; N2 the number of counted RaC particles; G a constant depended on the specific geometry of the detector head; and F the pump flow rate in liters per hour.

Figure 5:
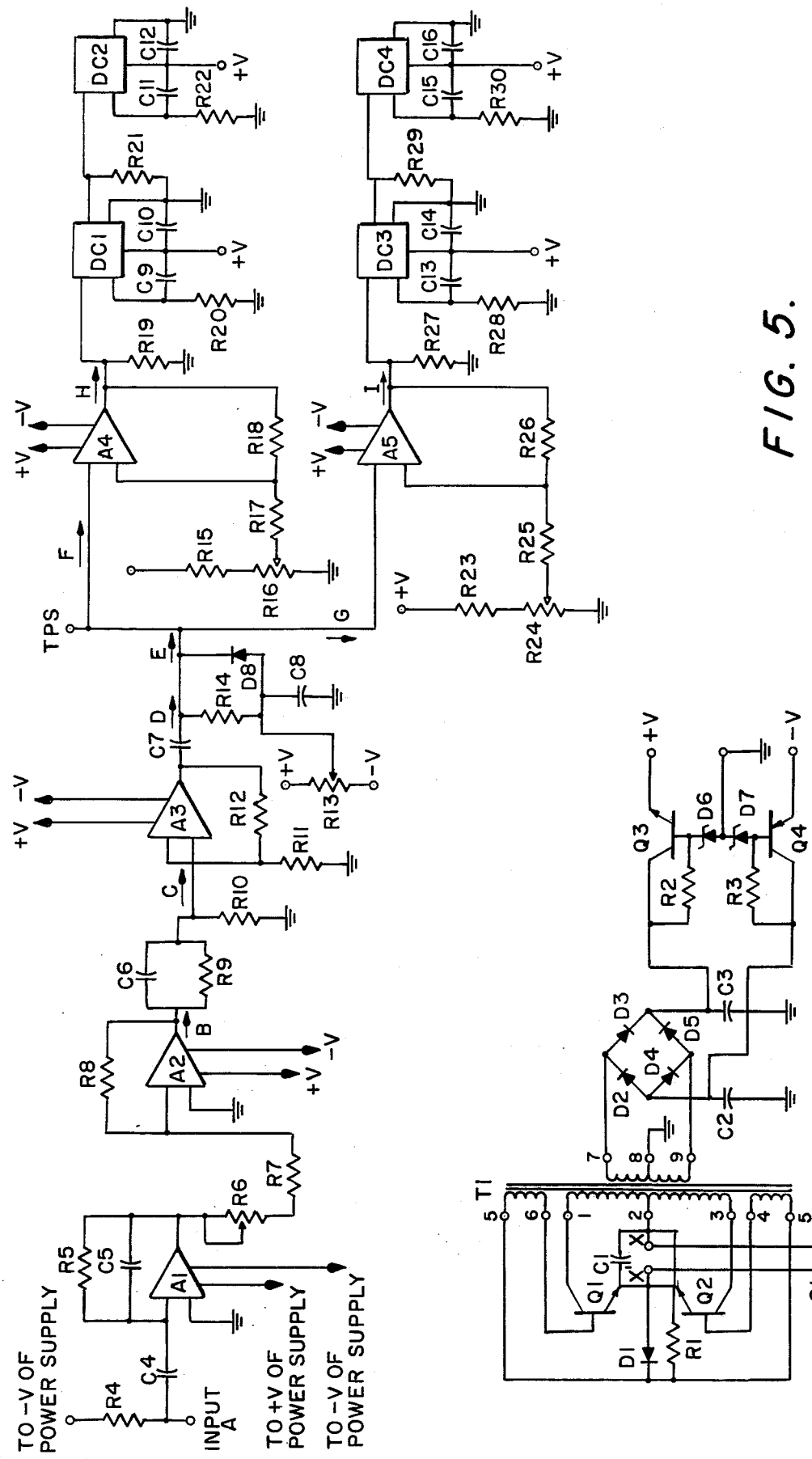
FIG. 5 is a circuit diagram for the FIG. 2 dosimeter unit and the miner's cap light power supply.

The wiring diagram for the dosimeter unit is illustrated in FIG. 5. Also shown is the external four volt battery circuit which is converted to a ± six volt value by the DC - DC converter in the lower left hand corner. Looking at the block diagram of FIG. 1 will allow a better understanding of how FIG. 5 works. Starting at the upper left hand side of FIG. 5, the pulse A from the radiation detector is transmitted to the charge amplifier represented by the operational amplifiers A1 and A2 with their feedback resistors R5 and R8, their capacitors C4 and C5, and connecting resistors R6 and R7. From the output of amplifier A2 signal B is sent to the pole/-zero, cancellation network made up of resistors R9 and R10 and capacitor C6. Signal C is then amplified by the main amplifier A3 with its associated resistors (R11 and R12) and capacitor C7. From this amplifier signal D is sent to the resistor R14, the capacitor C8, and the diode D8 which form the baseline restorer circuit. The next portion of the circuitry is the two discriminators and two counting cicuit. Discrimination is based on the voltage pulse height of the signal E. Amplifier A4 is set so that only pulses (F) above a certain level will actuate it. Similarly, amplifier A5 is set as a low threshold detector, above the normal noise levels, so that all pulses (G) over this level are passed. Output signals H and I from the two amplifiers A4 and A5, respectively, are counted by the associated digital counters represented by blocks DC1, DC2, DC3 and DC4. These digital counters are connected serially in pairs (DC1 and DC2, DC3 and DC4) to increase their capacity.

In the preferred embodiment the transistor amplifier A1 was type ICL 8007 by Intersil Co. of Cupertino, Calif.; the dual operational amplifiers A2 and A3 type LM747 by National Semiconductor Corp. of Santa Clara, Calif., the discriminator amplifiers type ICL 8001 by Intersil Co. of Cupertino, CA; and the four digital counters DC1 to DC4 type CD4020 by RCA of Somerville, N.J. The internal power supply is connected to the external four volt battery as shown in FIG. 5. It converts four volts to plus and minus six volts. In the arrangement shown, transistors Q1 and Q2, resistor $R_1$, capacitor $C_1$ and diode $D_1$ act together to form an oscillator. Transformer $T_1$, takes the output of this oscillator and converts it to a higher voltage. Thereafter, diode bridge $D_2$ to $D_5$, and capacitor $C_2$ and $C_3$ rectify and filter this higher voltage. The remaining circuit components of the power supply — transistors $Q_3$ and $Q_4$, resistors $R_2$ and $R_3$, and diodes $D_6$ and $D_7$ — form the plus and minus six volt regulator.

Figure 6:
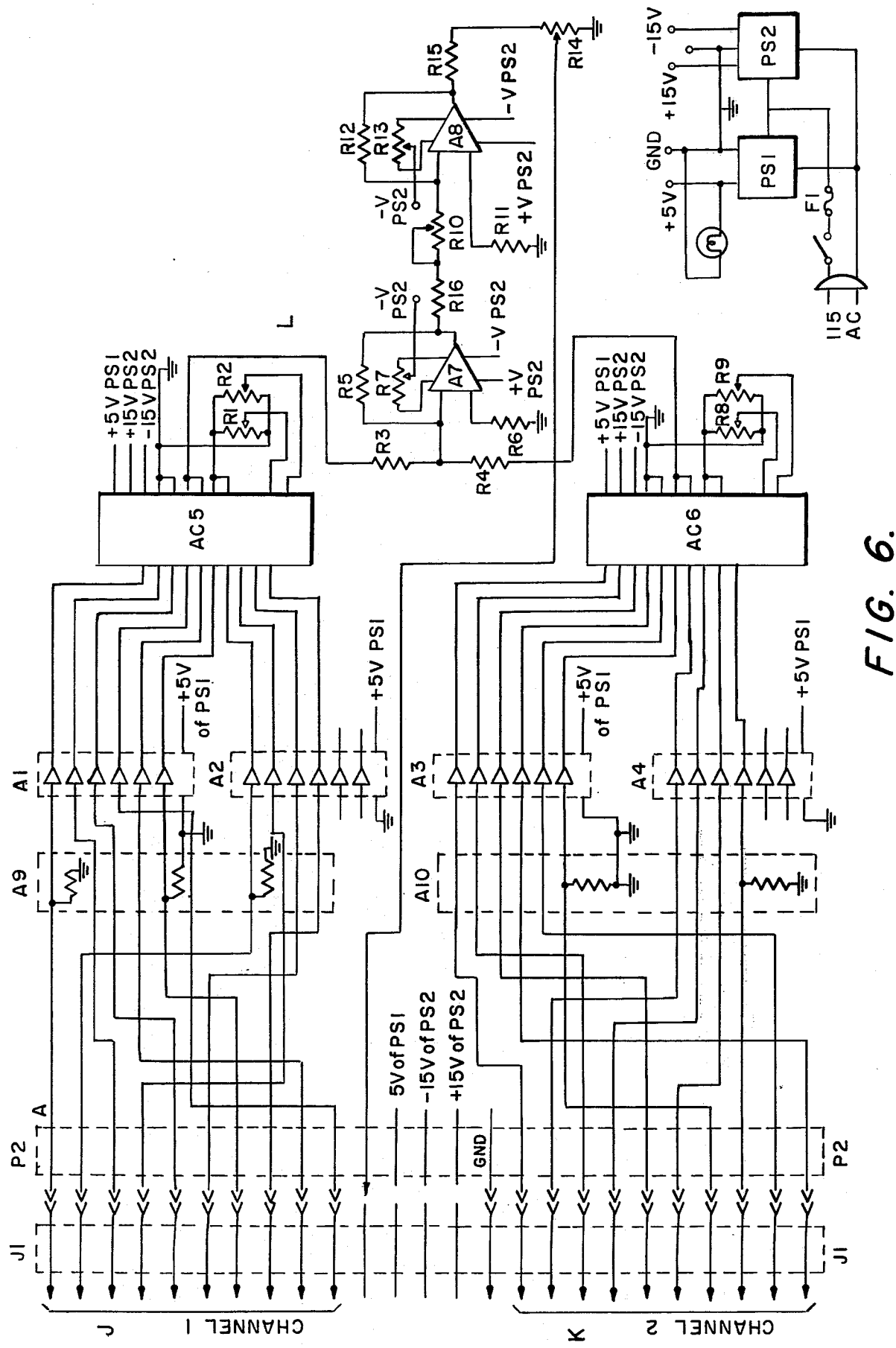
FIG. 6 illustrates the wiring diagram for the readout unit.

FIG. 6 is a wiring diagram for the central readout unit. The two major functions of this unit are to take the counts from the dosimeter and (1) subtract the two accumulated total counts from each other and (2) convert the binary data to working level hours in accordance with equation (1). The interconnections between the dosimeter and readout units are represented by the two columns J1 and P2. All data is in binary form with each of the two input channels having ten binary digits. The blocks enclosed by the dotted lines for A1, A3, A9 and A10 act as buffer registers for the bits. These bits are then converted to an analog voltage level in the two converters AC5 and AC6. From these units voltages L and M are sent to the amplifier A7 and its associated circuitry which perform the calculations needed for equation (1). This is accomplished by weighted sum amplification. Thereafter amplifier A8 and its circuitry performs a scaling function on the output from transistor A7.

Although this invention has been described with respect to the preferred embodiment it should not be used to limit the scope and extend of the invention which is to be measured only by the claims which follow.

I claim:

1. A portable radiation dosimeter unit for continuously measuring the working level exposure to radioactive particles comprising:
   a detector head housing having a filter head and solid state surface barrier radiation detector contained therein;
   said head housing having an ambient air inlet and outlet adapted to allow air to flow through said filter head before contacting said radiation detector;
   an air pump to force ambient air into said head housing inlet to the filter and radiation detector;
   electronic circuitry connected to said radiation unit for receiving and processing charged electrons received therefrom by converting them to pulses whose heights are representative of the energy levels of detected radioactive particles, said circuitry having means for discriminating and counting the pulses of different heights; and
   a portable self contained power supply operatively connected to said pump and electronic circuitry.

2. The dosimeter unit of claim 1 wherein said detector housing comprises: a plurality of separate interconnectable sections with said filter head having a filter inserted between two of said sections; and
   said radiation detector being adjacent to the filter and being located between two housing sections one of which is common to the filter sections.

3. The dosimeter of claim 2 wherein said common housing has said air inlets consisting of a series of inlet ports through the housing wall.

4. The dosimeter of claim 1 wherein said electronic circuitry comprises means to amplify the received pulses from the detector before they are discriminated and counted, said discrimination of pulses being accomplished by two voltage threshold detectors set at different levels.

5. The dosimeter unit of claim 1 wherein said detector head comprises:
   means for attaching the unit to a user; and
   a membrane filter paper in the filter head with a filtering ability to trap particles down to $0.8 \times 10^{-6}$ meters in diameter carried by the ambient air forced therethrough.

6. The dosimeter unit of claim 1 wherein the detected and counted initial energy levels are from alpha daughters of Radon 222 and in the 5 to 8 MeV energy range.

7. A portable radiation dosimeter unit for continuously measuring the working level exposure to radioactive particles in combination with a readout unit comprising:
   a detector head housing having a filter head and solid state surface barrier radiation detector contained therein;
   said head housing having an ambient air inlet and outlet adapted to allow air to flow through said filter head before contacting said radiation detector;
   an air pump to force ambient air into said head housing inlet to the filter and radiation detector;
   electronic circuitry connected to said radiation unit for receiving and processing charged electrons received therefrom by converting them to pulses whose heights are representative of the energy levels of detected radioactive particles, said circuitry having means for discriminating and counting the pulses of different heights;
   a portable self-contained power supply operatively connected to said pump and electronic circuitry;
   a readout unit for displaying the working level hours of detected radioactive exposure by the dosimeter;
   means for electrically transmitting the number of counted pulses in the dosimeter to the readout unit when connected thereto; and
   means within the readout unit for converting the pulses transmitted to the readout unit into a numerical display of the working level hours of detected exposure based upon a preset standard therein.

8. The combination of claim 7 wherein the means for converting the dosimeter pulses can differentiate between pulses received from two different radioactive isotopes.

* * * * *